Patented June 8, 1937

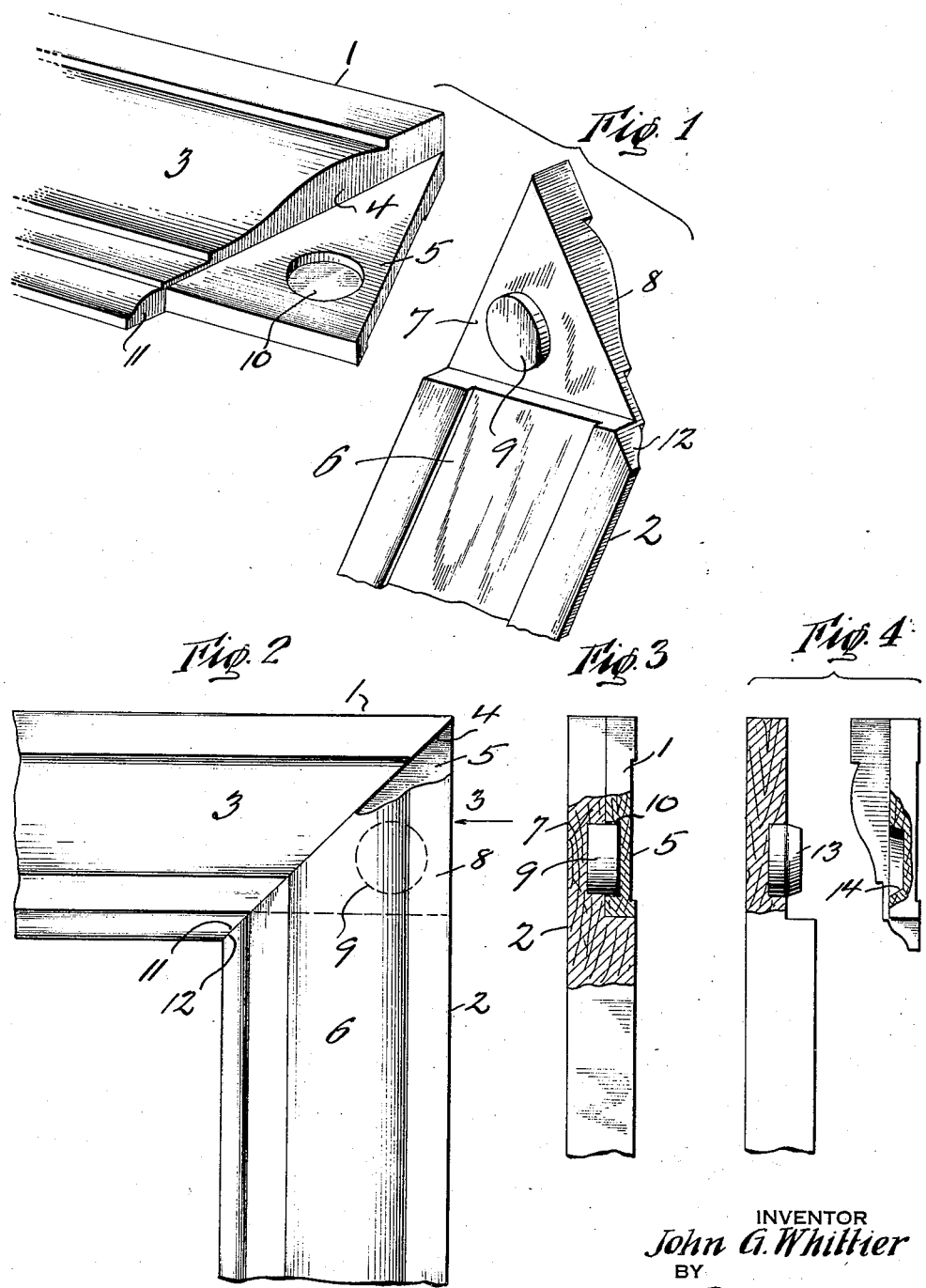

2,083,354

UNITED STATES PATENT OFFICE 2,083,354

JOINT

John G. Whittier, Maplewood, N. J.

Application July 25, 1936, Serial No. 92,494

3 Claims. (Cl. 20—92)

This invention relates to mitre joints for use in connection with the trim of a house, the frame of a picture or in any other relation where it may be desired to provide a mitre joint.

The main object and feature of the invention is to obviate the necessity of exposed or visible means for securing the members of the joint together, and also to facilitate the assembling or erection of the members comprising the joint as in the case of house trim by rendering it unnecessary to assemble the parts before erection.

In the accompanying drawing the invention is disclosed in several forms in which:

Fig. 1 is a disassembled perspective view of two members composing the joint, showing the opposed faces of the wings;

Fig. 2 is a view in elevation with parts broken away;

Fig. 3 is a view looking in the direction of arrow 3 of Fig. 2 with parts broken away and in section; and Fig. 4 is a view similar to Fig. 3 showing a modification but with the parts separated.

1 and 2 indicate the two members constituting the joint. Member 1 consists of a main portion 3 having at its end an oblique abutment wall 4 and provided with a rear wing 5 of less thickness than that of the main portion. Member 2 consists of a main portion 6 provided with a front wing 7 of less thickness than that of the main portion, said front wing having an oblique abutment wall 8 complementary to that of wall 4 of main portion 3 of the first member. 9 indicates a dowel, which may be of any suitable shape, on the face of one wing adapted to engage an opening or countersink 10 in the opposed face of the other wing.

It will be seen that, when the wings are placed in overlapped relation, a perfect joint is produced devoid of any visible or exposed connecting means as the parts can be fitted together by means of the dowel and countersink and secured with glue. It will further be understood that the dowel and countersink prevent the members from slidably disengaging each other and that the complementary oblique abutment walls prevent the dowel and countersink from acting as a pivot around which the members can be rotated. Again, it is clear that the members must be assembled by facewise engagement of the wings and not by a sliding movement with respect to each other. The result is that the trim of a window, for instance, need not be assembled before being erected and that at the same time the securing means are invisible.

As shown, the wings are substantially triangular shaped and, it will be noted, that, in the present instance, the height of the triangle is not equal to the width of say member 1 or, to put it differently, the wings are of less width than the main portions. This is because member 1 is of a gradually diminishing thickness so much so that wing 5 if carried from side to side of member 1 would be too flimsy. Oblique abutment wall 4 therefore terminates in an auxiliary wall 11, and wall 8 of wing 7 of member 2 is continued by an auxiliary wall 12 on main portion 6 of member 2, the two auxiliary walls being complementary but non-overlapping.

In addition to being of any desired shape, the dowel and countersink may be of taper-formation so as to more readily engage. This is shown in Fig. 4, where 13 indicates a tapered dowel and 14 is a tapered countersink.

I claim:

1. A mitre joint including: two members, one of said members comprising a main portion having at its end an oblique abutment wall from which extends a rear wing of less thickness than that of the main portion, and the other member comprising a main portion from the end of which extends a front wing of less thickness than that of the main portion, said front wing having an oblique abutment wall complementary to that of the abutment wall of the main portion of the first member, the wings of the two members being in overlapped relation, and means between the opposed faces of the wings admitting of facewise engagement of the wings but preventing slidable disengagement thereof.

2. A mitre joint including: two members, one of said members comprising a main portion having at its end an oblique abutment wall from which extends a rear wing of less thickness than that of the main portion, and the other member comprising a main portion from the end of which extends a front wing of less thickness than that of the main portion, said front wing having an oblique abutment wall complementary to that of the abutment wall of the main portion of the first member, the wings of the two members being in overlapped relation, and a dowel, circular in cross section, on the face of one of said wings fitting into a complementary opening in the opposed face of the other wing to thereby form a concealed means for preventing slidable displacement of said members each with respect to the other while admitting of facewise engagement of the wings.

3. A mitre joint including: two members, each comprising a main portion and a substantially triangular shaped wing portion, the wing portions being of less thickness and of less width than the main portions and arranged in overlapped relation, one of said main portions having an oblique abutment wall to engage a complementary abutment wall on the wing of the other main portion, auxiliary complementary abutment walls on both main portions forming continuations of the first-mentioned abutment walls, and means between the opposed faces of the wings to prevent slidable displacement of said members each with respect to the other.

JOHN G. WHITTIER.